Nov. 8, 1966
H. W. KOMPANEK
3,284,762
MECHANICAL-TO-ELECTRICAL TRANSDUCER
Filed March 26, 1965
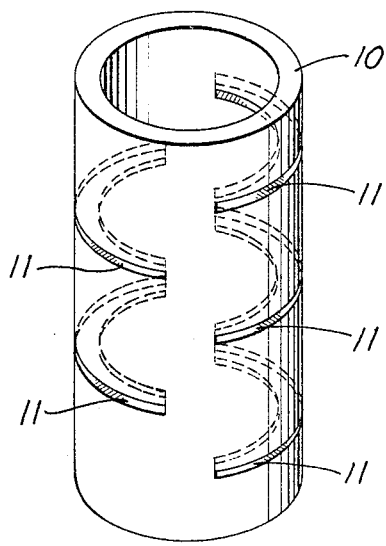
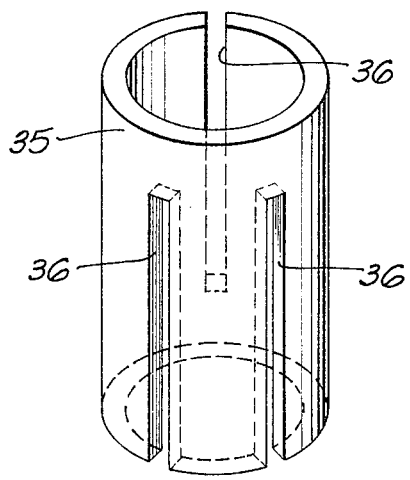
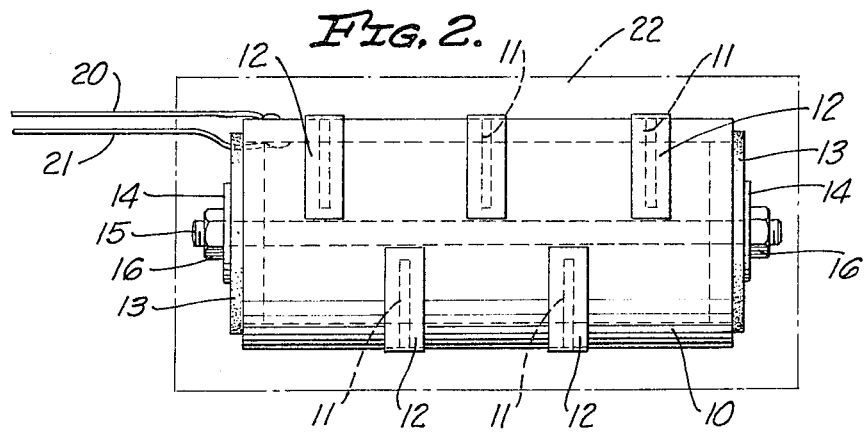
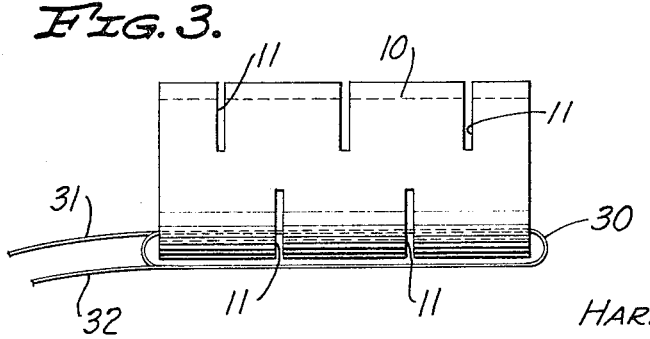
INVENTOR.
HARRY W. KOMPANEK
BY HIS ATTORNEYS
HARRIS, KIECH, RUSSELL & KERN _United States Patent Office_

3,284,762
Patented Nov. 8, 1966

3,284,762
MECHANICAL-TO-ELECTRICAL TRANSDUCER
Harry W. Kompanek, 153 Rametto Road,
Santa Barbara, Calif.
Filed Mar. 26, 1965, Ser. No. 443,017
7 Claims. (Cl. 340—11)

This invention relates to mechanical-to-electrical transducers and, in particular, to transducers having improved sensitivities and simplified construction. While the transducers to be described herein are referred to as mechanical-to-electrical transducers, it should be kept in mind that the transducer can be excited electrically to produce a mechanical output or can be driven mechanically to produce an electrical output, i.e., the transducer can be used either as a transmitter or as a receiver. The current principal uses for such transducers are in the fields of underwater acoustics and ultrasonics.

The gain, sensitivity, impedance and directionality are major characteristics which must be considered in the design and utilization of transducers. Simplicity of construction, dependability and cost are also factors. As is often the case, an improvement in one or more of the characteristics results in degradation of other characteristics and compromise is the usual end result.

It is an object of the present invention to provide a new and improved transducer which will provide desired directionality and at the same time the desired resonant frequency. A further object is to provide a new and improved transducer which will provide increased sensitivity. A particular object is to provide such a transducer which is a unitary structure and which requires only a single pair of terminals for connection into associated circuitry.

It is an object of the invention to provide a mechanical-to-electrical transducer comprising a piece of material which changes dimension when electrically excited and which has at least two vibration modes, with the piece having at least one slot disposed transverse to one of the vibration modes preventing vibration of the piece in the one mode. A further object is to provide such a transducer which utilizes piezoelectric materials such as piezoelectric ceramic. An additional object is to provide such a transducer which utilizes magnetostrictive materials such as a magnetostrictive ferrite.

It is an object of the invention to provide a mechanical-to-electrical transducer comprising a piece of material which changes dimension when electrically excited and which has a bore therethrough providing for hoop mode vibration and for length mode vibration, with the piece having one or more slots disposed transverse to one of the vibration modes for preventing vibration of the entire piece in the one mode. A further object is to provide such a transducer which may utilize various shapes of material and one which is not limited to the specific cylindrical tube shape illustrated.

Other objects, advantages, features and results will more fully appear in the course of the following description. The drawing merely shows and the description merely describes preferred embodiments of the present invention which are given by way of illustration or example.

In the drawing:

FIG. 1 is an isometric view of a preferred form of the transducer;

FIG. 2 is a side view of a piezoelectric type of the transducer potted for underwater use;

FIG. 3 is a side view of a magnetostrictive type of the transducer; and

FIG. 4 is a view similar to that of FIG. 1 illustrating another form of the transducer.

In one common arrangement for a transducer, a toroidal structure is used with the resonant frequency of the transducer being determined solely by the hoop mode vibration of the device. A toroid or cylindrical tube structure will vibrate primarily in the hoop mode when the diameter is very large with respect to the axial length. In a typical arrangement, the diameter may be in the order of five times the axial length.

The predominant resonant frequency of a ring is determined by the diameter. As the length of the tubular structure is increased to approach the diameter, the resonant frequency of the structure changes and its loading to the surrounding medium is also changed. Many transducers today require directionality in the axial plane and omnidirectionality in the radial plane. This means that the transducer must be very long with respect to the diameter. Prior practice has called for a number of rings stacked along the axis and acoustically isolated from each other for achieving the desired hoop mode resonant frequency and the desired vertical directionality. This type of construction is expensive and complicated.

The present invention provides a simple unitary transducer structure for achieving the desired directionality and resonant frequency. One such structure is illustrated in FIG. 1 and comprises a cylindrical tube 10 which may have an axial length several times its diameter. The tube is made of a material which changes dimension when electrically excited. A piezoelectric material, such as one of the piezoelectric ceramics currently available, will exhibit a change in mechanical dimension when an electrical potential is applied across the material. Magnetostrictive materials, such as magnetostrictive ferrites and nickel, also exhibit a change in physical dimension when exposed to a magnetic field produced by an electric coil disposed about the material. Conversely, the materials when stressed mechanically to produce dimensional changes will generate electrical signals, permitting use of the materials both as transmitters and receivers.

Radial slots 11 are provided in the tube 10, as by means of a diamond cutting wheel. The tube without the slots would tend to vibrate in the hoop mode and to vibrate in the length mode. The slots 11 are disposed transverse to the length mode vibration and substantially prevent length mode vibration of the piece with the vibration being restricted principally to the hoop mode. The resultant structure behaves acoustically as if it were a plurality of individual rings acoustically stacked with each ring having the diameter of the tube and a length one-sixth that of the tube. The one slotted tube can take the place of a stack of six individually supported tubes.

The resonant frequency of the structure will be a function of its physical size and the number, size and spacing of the slots and these parameters can be varied for any particular application. The operation will be as described for the specific embodiment of FIG. 1. The piece of material may have various shapes and sizes as desired but the cylindrical tube structure of FIG. 1 is a preferred form because of its ease of manufacture and low losses.

A typical application of the slotted tube of FIG. 1 for use in an underwater sound system is shown in FIG. 2. The individual slots 11 may be covered by pieces 12 of pressure sensitive tape and the open ends may be closed by cork discs 13 held in place by washers 14 and a throughbolt 15 with nuts 16. A conductive coating such as a layer of silver is applied on the inner surface and on the outer surface of the tube 10. A conductor 20 is fixed to the outer surface and another conductor 21 is fixed to the inner surface to provide for connecting the tube into the associated circuitry. The structure may then be enclosed in a quantity of potting material 22, typically polyurethane which has acoustic transmission characteristics substantially identical to that of water. The pieces of tape 12 and end caps 13 serve to keep the potting material out of the interior of the tube. If the device is to serve as an acoustical pickup, the leads 20, 21 may be connected to an amplifier for driving a meter or recorder. If the device is to act as an acoustical transmitter, an oscillator and amplifier may provide an exciting voltage for connection to the leads 20, 21.

FIG. 3 illustrates the use of a slotted tube of magnetostrictive material with a coil of wire 30 looped through the tube and with leads 31, 32 for connecting the coil to the associated circuitry. The number of turns on the coil is a matter of design and often only a single turn coil is used. The structure of FIG. 3 may be potted for underwater use in the same manner as the structure of FIG. 2 or may be left open for use in air.

FIG. 4 illustrates an alternative structure designed to vibrate only in the length mode, this being a structure which could be used in end fire transducers. A tube 35 is provided with axial slots 36 which prevent the tube from vibrating in the hoop mode. The resonant frequency will be determined by the axial length and the shape of the structure can be selected to provide optimum end radiation directionality without interference from lateral radiation produced by hoop mode vibration.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. A mechanical-to-electrical transducer comprising a tubular piece of material which changes dimension when electrically excited and which has hoop and length vibration modes, said piece having at least one slot through the wall thereof and disposed transverse to one of said vibration modes substantially preventing vibration of the piece in said one mode.

2. A mechanical-to-electrical transducer comprising:
a tubular piece of piezoelectric material which changes dimension when electrically excited and which has hoop and length vibration modes, said piece having at least one slot through the wall thereof and disposed transverse to one of said vibration modes substantially preventing vibration of the piece in said one mode;
electrical conductors disposed on opposing inner and outer surfaces of said tubular piece; and
means for connecting said conductors into an electrical circuit.

3. A mechanical-to-electrical transducer comprising:
a tubular piece of magnetostrictive material which changes dimension when electrically excited and which has hoop and length vibration modes, said piece having at least one slot through the wall thereof and disposed transverse to one of said vibration modes substantially preventing vibration of the piece in said one mode;
an electrical coil disposed about said piece; and
means for connecting said coil into an electrical circuit.

4. A mechanical-to-electrical transducer comprising a tubular piece of material which changes dimension when electrically excited, providing for hoop mode vibration and length mode vibration, said piece having a plurality of substantially parallel radial slots through the wall thereof substantially preventing vibration in the length mode.

5. A mechanical-to-electrical transducer comprising a tubular piece of material which changes dimension when electrically excited, providing for hoop mode vibration and length mode vibration, said piece having a plurality of substantially parallel axial slots through the wall thereof, with each of said slots extending to one end only of said tubular piece substantially preventing vibration in the hoop mode.

6. A cylindrical tube of piezoelectric ceramic having a plurality of radial slots through the wall thereof and being less in length than the circumference of said tube, and coatings of electrical conductor on the inner and outer surfaces.

7. A cylindrical tube of piezoelectric ceramic having at least one axial slot through the wall thereof and extending to one end only of the tube, and coatings of electrical conductor on opposing surfaces of said tube.

References Cited by the Examiner

UNITED STATES PATENTS

| | | | |
|---|---|---|---|
| 2,870,521 | 1/1959 | Rudnick | 310—8.2 |
| 2,928,069 | 3/1960 | Petermann | 340—10 |
| 2,962,695 | 11/1960 | Harris | 340—10 |
| 3,111,595 | 11/1963 | Junger | 340—10 |
| 3,199,071 | 8/1965 | Massa | 340—10 |

OTHER REFERENCES

Albers, V. A. Underwater Acoustics Handbook. Penn. State University Press, 1960, p. 140.

CHESTER L. JUSTUS, *Primary Examiner*.

G. M. FISHER, *Examiner*.